(12) United States Patent
Wang (10) Patent No.: US 10,182,559 B2
(45) Date of Patent: Jan. 22, 2019

(54) ROTATING TUBES AQUARIUM GRAVEL CLEANING SYSTEM

(76) Inventor: Guangke Wang, Bristol (GB)

(*) Notice: Subject to any disclaimer, the term of this patent is extended or adjusted under 35 U.S.C. 154(b) by 832 days.

(21) Appl. No.: 13/555,137

(22) Filed: Jul. 21, 2012

(65) Prior Publication Data

US 2013/0061933 A1 Mar. 14, 2013

(30) Foreign Application Priority Data

Sep. 14, 2011 (GB) .................................. 1115901.9

(51) Int. Cl.
*A01K 63/04* (2006.01)
(52) U.S. Cl.
CPC ....... *A01K 63/045* (2013.01); *Y10T 137/0318* (2015.04); *Y10T 137/85978* (2015.04)
(58) Field of Classification Search
CPC .. A01K 63/003; A01K 63/006; A01K 63/045; Y10T 137/0318; Y10T 137/85978
USPC ........................................................ 119/264
See application file for complete search history.

(56) References Cited

U.S. PATENT DOCUMENTS

| | | | | | |
|---|---|---|---|---|---|
| 3,035,702 A | * | 5/1962 | Marvin | ................ | A01K 63/045 210/167.23 |
| 3,247,826 A | * | 4/1966 | Girard | .................. | A01K 63/045 119/259 |
| 3,337,889 A | * | 8/1967 | West | ........................ | B08B 9/08 15/1.7 |
| 3,688,907 A | * | 9/1972 | Oravec | ................... | A01K 63/04 210/167.26 |
| 3,827,560 A | * | 8/1974 | Morton | ................. | A01K 63/045 210/167.23 |
| 3,903,844 A | * | 9/1975 | Greenia | ................. | A01K 63/04 119/250 |
| 4,490,250 A | * | 12/1984 | Dockery | .............. | A01K 63/047 210/167.27 |
| 4,817,561 A | * | 4/1989 | Byrne | ................... | A01K 63/045 119/260 |
| 4,913,811 A | * | 4/1990 | Huang | ................. | A01K 63/045 119/264 |
| 5,160,431 A | * | 11/1992 | Marioni | ............... | A01K 63/045 119/259 |
| 5,179,911 A | * | 1/1993 | Chow | ................... | A01K 63/045 119/259 |
| 5,199,378 A | * | 4/1993 | Kissick, Jr. | .......... | A01K 63/045 119/232 |
| 5,234,581 A | * | 8/1993 | Rosenberg | ........... | A01K 63/045 119/260 |

(Continued)

*Primary Examiner* — Jessica B Wong (57) ABSTRACT

This disclosure comprising: a tubular member (4) comprising openings (2) arranged along its length; a receiving portion (3) comprising a passage (3*a*) for receiving the tubular member such that the tubular member fits within and is free to rotate with respect to the receiving portion, wherein the receiving portion comprises openings (1) arranged along its length; and a drive member (21) configured to rotate the tubular member. The openings of the tubular member and receiving portion are arranged such that there is an at least partial overlap between the openings of the tubular member and receiving portion, and that as the tubular member rotates with respect to the receiving portion the opening overlap moves along the length of the tubular member and receiving portion and fluid is sucked into the tubular member, or expelled from it at successive longitudinal locations.

3 Claims, 4 Drawing Sheets

(56) References Cited

U.S. PATENT DOCUMENTS

| | | | | |
|---|---|---|---|---|
| 5,419,831 A * | 5/1995 | Fuerst | ............... | A01K 63/04 |
| | | | | 210/151 |
| 5,423,978 A * | 6/1995 | Snyder | ............... | A01K 63/04 |
| | | | | 210/151 |
| 5,560,318 A * | 10/1996 | Yoshida | ............... | A01K 63/003 |
| | | | | 119/227 |
| 5,779,884 A * | 7/1998 | Raymo | ............... | A01K 63/006 |
| | | | | 119/264 |
| 5,799,612 A * | 9/1998 | Page | ............... | A01K 63/045 |
| | | | | 119/260 |
| 6,276,302 B1 * | 8/2001 | Lee | ............... | A01K 63/003 |
| | | | | 119/248 |
| 2003/0047496 A1 * | 3/2003 | Yano | ............... | A01K 63/04 |
| | | | | 210/150 |
| 2003/0116489 A1 * | 6/2003 | Terato | ............... | A01K 63/045 |
| | | | | 210/167.21 |
| 2004/0035475 A1 * | 2/2004 | Bradford, III | ............... | F16K 11/074 |
| | | | | 137/625.11 |
| 2012/0145613 A1 * | 6/2012 | Chen | ............... | A01K 63/045 |
| | | | | 210/167.23 |

* cited by examiner

ROTATING TUBES AQUARIUM GRAVEL CLEANING SYSTEM

CROSS-REFERENCE TO RELATED APPLICATIONS

This application is a broadened one of British application number 1115901.9, filing date Sep. 14, 2011, by the same inventor. The present disclosure relates to a fluid transfer system and particularly but not exclusively relates to a focussed fluid transfer system such as a gravel cleaning system for an aquarium, e.g. for fish, reptiles etc.

BACKGROUND

The transfer of fluids is required in many applications. For example, fluids may be sucked from or expelled into a region. One particular application for a fluid transfer system is in aquariums for which it may be desirable to transfer fluids, for example to clean the aquarium gravel.

The use of gravel in an aquarium is not only for decoration but for collection of the debris and organic wastes which settle toward the bottom of the tank. However, it is necessary to periodically remove the particulate debris and organic wastes produced by the fish and aquatic plants in the gravel in order to maintain a healthy environment for the fish.

In this respect, there are two main methods for removing the sediment accumulated in aquarium gravel. The first method comprises cleaning the gravel using a siphon tube or suction tube to remove the sediment in the gravel from above. There are several kinds of siphon tube used at present, for example, GB2110103 discloses a siphon device with a relatively wide inlet tube and a narrow siphon tube. In addition, U.S. 2009045143 discloses a gravel vacuum including a suction tube, a pre-filter tower connected to the suction tube, a filter tower, a pump and a return assembly to return the filtered water back to the tank. However, in each case, cleaning the gravel using a suction tube from above leads to problems such as interruption of the fish, the time required to clean the gravel thoroughly, excessive removal of the water and labour intensive.

The second main method for removing the sediment from the gravel is to remove the sediment from beneath the gravel, for example, using an under-gravel filter system, which may be self-cleaning to avoid the problems mentioned above. By way of example, U.S. Pat. No. 6,007,713 discloses a system comprising: screen structures which cover the bottom of an aquarium; a cleaning element slidably mounted under the screen structures; and a suction tube extending upward from the screen structures. Each screen structure has a porous top adapted to support a layer of gravel thereon in spaced relation to the bottom of an aquarium and to allow water and debris to fall into a debris receiving space. The cleaning elements may be moved back and forth by an elongated handle to wipe off the debris in the receiving space between the top screen structure and the bottom of the aquarium and push it towards the suction tube which removes the debris from the aquarium.

U.S. Pat. No. 4,921,614 also discloses an under-gravel filter system having a slidable cleaning element extending across the width of the tank between a screen structure and the bottom of the tank. In U.S. Pat. No. 4,921,614 the cleaning element pushes the debris collected between the screen and the bottom of the tank to a conduit which draws water and the debris out of the tank where it is disposed or otherwise filtered and returned to the tank. The cleaning element has a metallic bar therein which allows the bar to be moved across the bottom of the tank by a magnetic source such as a hand held magnet placed against the bottom of the tank.

In addition, U.S. Pat. No. 4,957,623 discloses a system comprising an aperture gravel-supporting floor plate mounted on the top of a frame and defines a space between the frame and the plate. A stationary guide tube extends upwardly from the floor plate. A movable suction head is located within the space and is connected to a movable siphon tube extending upwardly through the guide tube for movement back and forth to withdraw the contaminants.

Furthermore, U.S. Pat. No. 5,179,911 discloses an under-gravel cleaning apparatus that has a means for flushing the water and debris from the space between a screen structure and the bottom of the tank. This is accomplished by forcing water into one end of the space between the screen structure and the bottom of the tank through a feed tube and drawing the water out of the opposite end of the space through a tube system leading out of the bottom of the tank.

JP2003236317 discloses an aquarium cleaning system, which has a gravel placing means located immediately above a bottom part, the system comprises (a) a water flushing tube located on one end part of the aquarium containing a first tubular member which has first and second end parts and is nearly vertical, (b) a water draining tube disposed on the opposing end part of the aquarium containing a second tubular member which has first and second end parts and is nearly vertical, and (c) a water circulation tube disposed on the opposing end part of the aquarium containing a third tubular member which has first and second end parts and is nearly vertical.

In addition to the above-mentioned prior art documents, other gravel cleaning systems are disclosed in CA1231871, CA2094416 and JP2008284443.

However, the previously-proposed cleaning gravel cleaning systems or methods have not been particularly effective. There are two main reasons for this lack of success. Firstly, all the under gravel cleaning devices mentioned need the screen to match the size of the bottom of tank. Practically, this strictly limits the popularity of such devices as tanks vary in size and shape. Secondly, all the prior art documents disclose the removal of debris from the space between the structure and the bottom of the tank. As such, these documents mainly rely on gravity causing the debris to drop down through the hole of the structure to the space between the structure and the bottom of the tank. As a result the previously-proposed cleaning gravel cleaning systems do not clean the gravel thoroughly or efficiently.

The present disclosure therefore seeks to address these issues.

SUMMARY OF THE INVENTION

According to a first aspect of the present invention there is provided a fluid transfer system or assembly comprising: a tubular member comprising one or more openings arranged along the length of the tubular member, wherein the tubular member is connectable to a pump arranged to suck fluid, e.g. water or air, from within or expel fluid to the tubular member; a receiving portion, the receiving portion comprising a passage for receiving the tubular member such that the tubular member fits within the passage and that the tubular member is free to rotate with respect to the receiving portion, wherein the receiving portion comprises one or more openings arranged along the length of the receiving portion passage; and a first drive member configured to rotate the tubular member with respect to the receiving portion; wherein the openings of the tubular member and receiving portion are arranged such that there is an at least partial overlap between the openings of the tubular member and receiving portion at a particular longitudinal location and at a particular relative rotational position between the tubular member and receiving portion, and that as the tubular member rotates with respect to the receiving portion the opening overlap moves along the length of the tubular member and receiving portion and fluid is sucked into the tubular member from, or expelled from the tubular member to, a region adjacent to the fluid transfer system at successive longitudinal locations.

The first drive member may comprise one or more vanes provided in the tubular member. The vanes may be configured to rotate the tubular member upon the flow of fluid through the tubular member. The first drive member may comprise a motor operatively connected to the tubular member.

The openings of the tubular member and/or receiving portion may comprise a slit shaped opening which may be disposed, e.g. spirally, along the length of the tubular member and/or receiving portion passage.

The tubular member and/or receiving portion may comprise a plurality of openings. The openings of the tubular member and/or receiving portion may be longitudinally disposed along the tubular member and/or receiving portion passage. The one or more openings of the tubular member and/or receiving portion may be spirally disposed about the tubular member and/or receiving portion passage.

The fluid transfer system may further comprise a plurality of tubular members, which may be arrangeable within one or more receiving portions.

The fluid transfer system may further comprise a selecting means arranged to selectively provide suction or expulsion from the pump to each of the tubular members in turn. The selecting means may comprise a rotatable member with an opening which is selectively connectable to a particular tubular member by virtue of the rotation of the rotatable member. The fluid transfer system may further comprise a second drive member configured to rotate the rotatable member. The selecting means may comprise a biased connector which is configured to provide a seal between the opening of the rotatable member with the particular tubular member.

The fluid transfer system may further comprise a first valve arranged to selectively connect the pump to the tubular member. The fluid transfer system may further comprise a second valve, which may be arranged to selectively connect the pump to a container for receiving the suctioned fluid or for providing the fluid to be expelled.

The fluid transfer system may be arrangeable adjacent to gravel within an aquarium to clean the aquarium gravel.

The first valve may selectively connect the pump to a source of clean fluid, e.g. water. The second valve may selectively connect the pump to the aquarium to provide the aquarium with the clean fluid.

The fluid transfer system may further comprise one or more nozzles arranged adjacent to the gravel. The nozzles may be fluidically connected to fluid in the aquarium. The fluid transfer system may further comprise piping connecting the nozzles to fluid in the aquarium above the gravel.

According to a second aspect of the present invention there is provided a method of transferring fluid using the aforementioned fluid transfer system.

In addition to an aquarium gravel cleaning system, the present invention may be applied in other applications requiring the transfer of fluids, for example, where a focussed flow of fluids, whether by suction or expulsion, is required. Particular examples include a vacuum suction head (e.g. for a vacuum cleaner), a tune changeable musical instrument (e.g. flute), a water feature (e.g. a fountain or sprinkler) or any other fluid transfer system or assembly. The features described above may equally apply to any of these applications.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION

Figure 1:
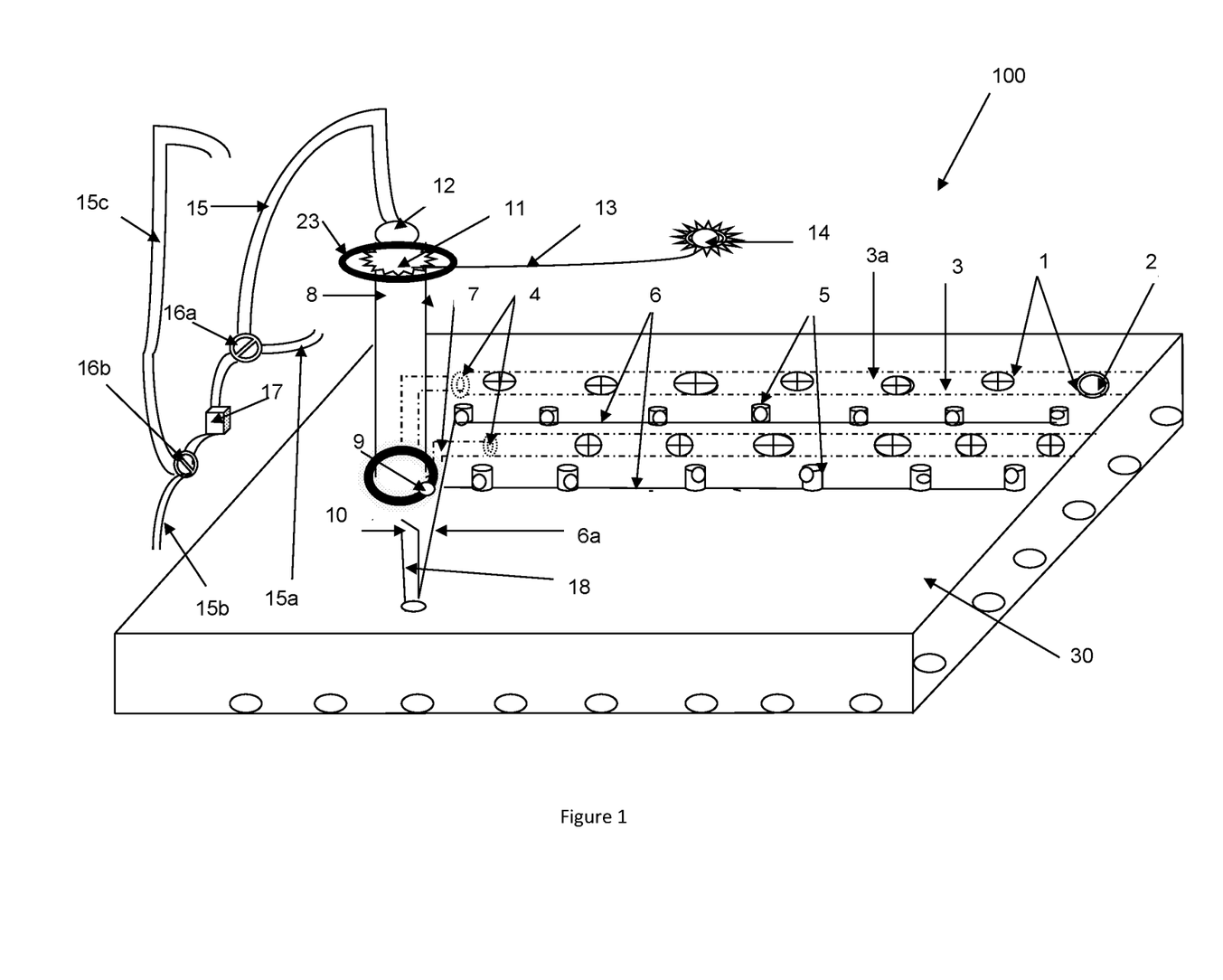
FIG. 1 is a perspective schematic view of the aquarium gravel cleaning system according to an example of the present invention.
Figure 4:
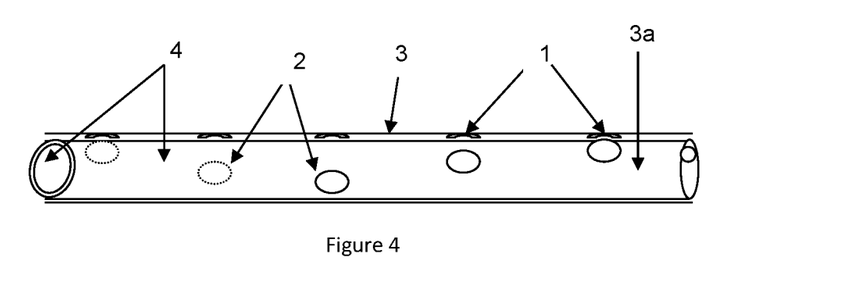
FIG. 4 is a schematic view of a receiving portion passage and a tubular member according to an example of the present invention.

With reference to FIG. 1, a fluid transfer system may according to an example of the present invention comprise a gravel cleaning system 100 for an aquarium. The gravel cleaning system 100 may comprise a tubular member 4 and a base assembly 30 comprising a receiving portion 3 adapted to receive the tubular member 4. The base assembly 30 may be provided at the bottom of the aquarium. As a result, the receiving portion 3 may be arrangeable adjacent to gravel at the bottom of the aquarium and receives the tubular member 4. The tubular member 4 and receiving portion 3 may be substantially horizontal. The receiving portion 3 may comprise a passage 3a for receiving the tubular member 4 such that the tubular member may fit within the passage 3a and that the tubular member may be free to rotate with respect to the receiving portion 3. The tubular member 4 may comprise a hollow cylinder and the receiving portion 3 may comprise a cylindrical tunnel for receiving the tubular member 4. As shown in FIG. 4, the tubular member 4 may substantially occupy the space within the receiving portion 3, while the tubular member 4 may still rotate freely within the tunnel of the receiving portion 3.

As depicted in FIG. 1, the base assembly 30 may be rectangular in cross-section and may comprise one or more receiving portions 3 each with a passage 3a receiving a corresponding tubular member 4. Adjacent receiving portions 3 may be integrally formed, e.g. unitary. However, the receiving portions may be modular and may be connected to adjacent receiving portions each with a tubular member. In an alternative arrangement (not shown), the receiving portion may also comprise a hollow cylinder and there may be a plurality of such receiving portions provided within the aquarium. Such an arrangement would allow greater flexibility in the positioning of the receiving portions in the aquarium. In either case, the receiving portion and tubular member combination may be configured to cover a range of aquarium sizes.

Figure 2:
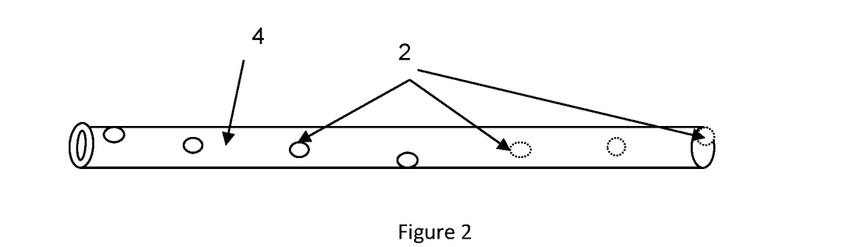
FIG. 2 is a plan view of a tubular member according to an example of the present invention.

As shown in FIGS. 2 and 4, the tubular member 4 may comprise one or more openings 2 arranged along the length of the tubular member 4. Similarly, as shown in FIGS. 1 and 4, the receiving portion 3 may comprise one or more openings 1 arranged along the length of the receiving portion passage 3a. For example, the openings 1 of the receiving portion 3 may be arranged in a side-wall of the receiving portion passage 3a and the openings 2 of the tubular member 4 may be arranged on a side-wall of the tubular member 4.

The openings 1, 2 of the receiving portion 3 and the tubular member 4 are longitudinally disposed along the length of the receiving portion passage 3a and tubular member. The openings 1, 2 are disposed at corresponding longitudinal locations so that corresponding openings 1, 2 may overlap at a particular relative rotational position. The openings 1, 2 of the receiving portion 3 and the tubular member 4 may have the same shape and there may be the same number of openings 1 of the receiving portion 3 as openings 2 of the tubular member 4.

As depicted in FIGS. 2 and 4, the openings 2 of the tubular member 4 may be spirally disposed about the tubular member. By contrast, the receiving portion openings 1 may be provided on a top side of the receiving portion 3 and the openings 1 may be longitudinally aligned. The openings 1 may also be provided on a side-wall of the receiving portion 3. In the alternative arrangement where the receiving portion is a hollow cylinder, the openings 1 may be disposed about the circumference of the receiving portion, e.g. they may be disposed in a spiral fashion.

The tubular member 4 may be fluidically connected to a pump 17 arranged to suck water from within the tubular member. As described above, the openings 1, 2 of the receiving portion 3 and tubular member 4 may be arranged such that there is an at least partial overlap between the openings 1, 2 at a particular longitudinal location and at a particular relative rotational position between the tubular member 4 and receiving portion 3. Thanks to the arrangement of the tubular member openings 2, the overlap of the openings 1, 2 moves to successive openings along the length of the tubular member 4 as the tubular member rotates with respect to the receiving portion 3. As a result, water from the aquarium may be sucked through the opening overlap and into the tubular member from around the gravel at successive longitudinal locations. The detritus from around the gravel may thus be removed.

When the tubular member 4 rotates the opening 2 on the tubular member 4, which has met and overlapped with the corresponding opening 1 on the receiving portion passage 3a, may move away from the opening 1 and the next opening 2 along the tubular member 4 may meet the next opening 1 along the receiving portion passage 3a such that the next openings 1, 2 may overlap and be in an open position to the gravel. Accordingly, there may be only one pair of openings exposed to the gravel while the others are in a closed position (although more than one pair of openings 1, 2 per tubular member 4 may be open at a particular time, e.g. in the case of a spiral of openings 2 which continues for more than one revolution about the tubular member 4). By only having a limited number of the openings 1, 2 overlapping at a particular time, a stronger suction and greater water flow rate can be provided locally. As a result, all the gravel over or around the receiving portion 3 can in turn be effectively suctioned.

The openings 1 and/or openings 2 of the receiving portion 3 and tubular member 4 may be sized to avoid the adjacent gravel entering the tubular member 4. For example, the openings 1 and/or openings 2 may be smaller than the majority of the gravel pieces, e.g. smaller than the smallest pieces of gravel. By contrast, the openings 1 and/or openings 2 may be sufficiently large to receive the detritus from around the gravel.

Between these extremes, the openings 1 and/or openings 2 may also be sized to optimise the suction pressure and/or cleaning rate.

In addition to the openings 1, 2 provided in the side-walls of the receiving portion passage 3a and tubular member 4, openings may be provided at a distal end of the receiving portion passage 3a and tubular member 4. Water may be sucked through such openings regardless of the relative rotational position of the receiving portion 3 and tubular member 4 or preferably only when such openings overlap in a manner similar to that for openings 1, 2. The openings at the end of the receiving portion passage 3a and tubular member 4 may provide additional suction to clean the gravel at the edge of the receiving portion. Alternatively or additionally, the openings in the side-walls of the receiving portion 3 and tubular member 4 may be spaced and/or sized such that there is always an overlap between openings 1, 2 and that a flow of fluid is always permitted from the aquarium to the centre of the tubular member 4. The openings 1, 2 of the receiving portion 3 and tubular member 4 may also be shaped so that the total overlap area between the openings 1, 2 remains constant.

Figure 3:
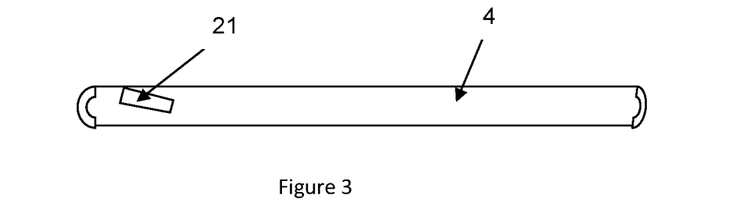
FIG. 3 is a cross sectional view of a tubular member according to an example of the present invention with two fins on its inner wall.

The gravel cleaning system 100 further comprises a first drive member configured to rotate the tubular member 4 with respect to the receiving portion 3. As depicted in FIG. 3, the first drive member may comprise one or more fins or vane surfaces 21 provided in the tubular member 4. By way of example there may be two or three vanes 21 per tubular member 4. The vanes 21 may be configured to rotate the tubular member 4 upon the flow of water through the tubular member. When the water flow goes through the tubular member 4 it will impel the fins and drive the tubular member 4 to spin. The vanes 21 may be provided at or towards an end of the tubular member 4, e.g. at a downstream end where the flow of water through the tubular member is greatest. In an alternative arrangement (not shown), the first drive member may comprise a motor operatively connected to the tubular member directly or via a gear assembly in order to rotate the tubular member.

Referring still to FIG. 1, the gravel cleaning system 100 may further comprise one or more nozzles 5. A nozzle 5 may be provided for each opening 1 in the receiving portion 3 and the nozzle 5 may be directed towards the corresponding opening 1. The nozzles 5 may be provided in rows, with a row for each receiving portion passage 3a, e.g. in the case of there being a plurality of receiving portion passages and tubular members 4. Each row of nozzles 5 may fluidically connect to a pipe 6. The pipe 6 may be provided in the base assembly 30 and the pipe 6 may be located between adjacent receiving portion passages 3a. The pipes 6 for each of the rows of nozzles 5 may fluidically connect to a connecting pipe 6a. The connecting pipe 6a may also be provided within the base assembly 30 and the connecting pipe 6a may pass over or under the passages 3a. The connecting pipe 6a may in turn be fluidically connected to a water supply tube 18 with an inlet 10. The water supply tube 18 may be substantially vertically disposed and the inlet 10 may be provided at a top end of the water supply tube above the level of the gravel. The inlet 10 may thus provide an opening for the tank water to get in and flow to the nozzles 5 via connecting pipe 6a and pipes 6.

The nozzles 5 may assist the cleaning suction, for example when using smaller gravel or a thick layer of gravel. For example, the nozzles 5, pipes 6, 6a and water supply tube 18 may provide a flow path for the water to the openings 1, 2 with a lower resistance than through the smaller gravel or thick layer of gravel. The suction rate may therefore be enhanced by the presence of the nozzles 5.

Figure 5:
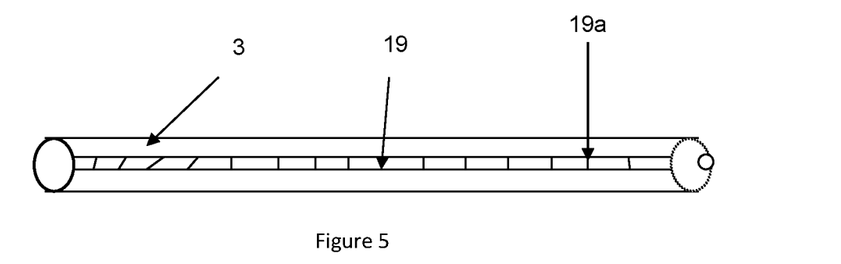
FIG. 5 is a plan view of the receiving portion passage according to a further example of the present invention.
Figure 6:
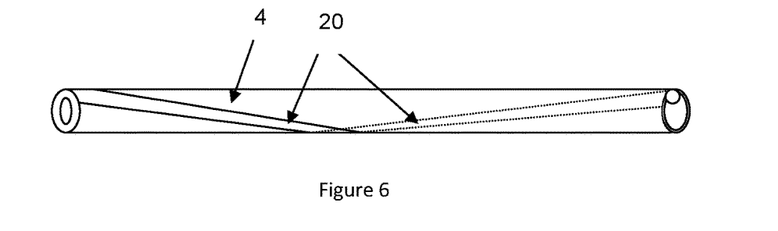
FIG. 6 is a plan view of the tubular member according to a further example of the present invention.

Referring to FIG. 5, the opening 1 in the receiving portion passage 3a may be in the form of a slit 19, e.g. instead of the discrete holes shown in the previous FIGS. The slit 19 may be longitudinally disposed along the length of the passage 3a or the slit may be spirally disposed, e.g. in the case of the receiving portion 3 being tubular. As depicted in FIG. 6, the tubular member 4 may additionally or alternatively have an opening 2 in the form of a slit 20. In the case of one of the slits 19, 20 being longitudinally disposed, the other of the slits 19, 20 may be spirally disposed. Alternatively, both slits 19, 20 may be spirally disposed. In the case of both slits being spirally disposed, the angle of the spiral for the slits 19, 20 may be different to ensure that an overlap does not occur at all longitudinal locations at once. By way of example, the spiral slits 19, 20 may be orientated in opposite rotational directions, e.g. clockwise and counter-clockwise spirals. Although not shown, either or both of the spiraled slits 19, 20 may be orientated in both directions, e.g. with both clockwise and counter clockwise spirals and a point of inflection at which the spiral changes direction.

As depicted in FIG. 5, the slit 19 in the receiving portion 3 may comprise grid bars 19a disposed across the slit 19. The grid bars 19a may prevent the unwanted inhalation of small gravel pieces into the tubular member 4. The grid bars 19a may be disposed across the top of the slit 19. Similar grid bars may additionally or alternatively be provided across the slit 20 of the tubular member 4.

Figure 7:
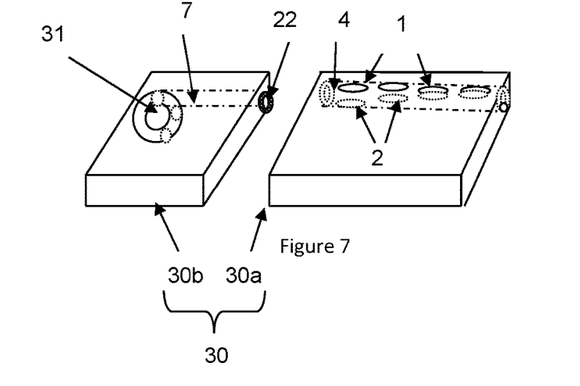
FIG. 7 is a schematic view of the two main parts of the base assembly according to an example of the present invention.

With reference to FIG. 7, the gravel cleaning system 100 may further comprise a base assembly 30 comprising two or more constituent parts. A first part 30a may comprise one or more of the receiving portion passages 3a. One or more of the first parts 30a may connect to a second part 30b, which may act as a hub for the first parts 30a. The second part 30b may in turn connect to the pump 17 to provide suction to the tubular members 4. The separation of the first and second parts 30a, 30b may permit the assembly of the tubular members 4 into the receiving portion passages 3a within the first part. The separation of the first and second parts 30a, 30b may also permit ready disassembly, e.g. to clean the components. The discrete first and second parts 30a, 30b of the base assembly may also permit a modular system, with additional first parts 30a being added for a larger aquarium.

The second part 30b of the base assembly 30 may comprise one or more passages 7 which are in fluid communication with corresponding receiving portion passages 3a. The passages 7 may converge on a chamber 31 within the second part 30b of the base assembly 30. The chamber 31 may fluidically connect to the pump 17 and may thus serve to distribute the suction from the pump to one or more of the tubular members 4. Although not shown in FIG. 7, the nozzles 5, pipe 6, connecting pipe 6a and water supply tube 18 may be provided in or on the first part 30a of the base assembly 30.

A fluid tight connection may be provided between the first and second parts 30a, 30b of the base assembly 30. A male-female type connection with a passage therethrough may be provided in this regard. In any event, one part of the base assembly 30 may overlap with the other when the first and second parts 30a, 30b are assembled so that a fluid tight connection between the passage 7 and receiving portion passage 3a is provided and there is no significant loss of suction. Alternatively or additionally, the proximal end of each tubular member 4 may be connected to a ball bearing type connector 22, which may be connected to the second part 30b of the base assembly 30 around the opening of the passage 7. The connector 22 may comprise a passage therethrough and the tubular member 4 may abut a ball part of the connector. The connector 22 may thus permit relative rotation between the tubular member 4 and base assembly 30, whilst ensuring a fluid tight connection.

Figure 8:
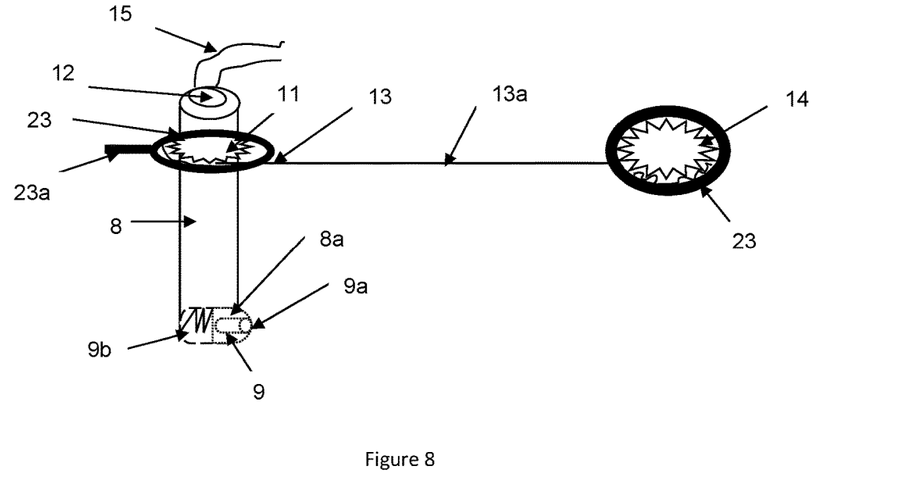
FIG. 8 is a schematic view of the rotating member, its control and a spring backed connector according to an example of the present invention.
Figure 9:
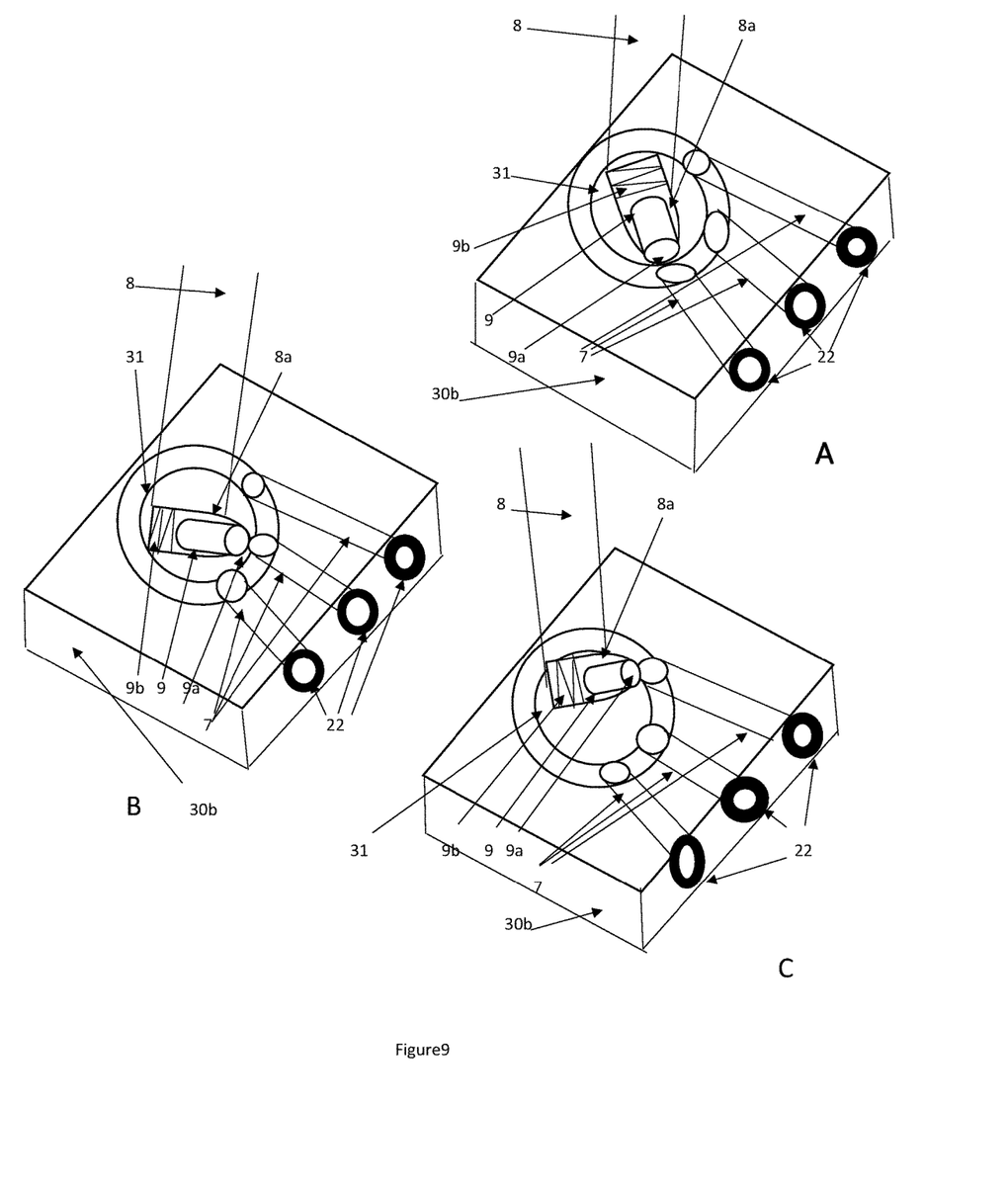
FIG. 9 is a perspective schematic view of connection of the rotatable member and a particular passage for tubular member

With reference to FIGS. 1, 8 and 9, in the case of there being a plurality of receiving portions 3 and tubular members 4, the gravel cleaning system 100 may further comprise a selecting means arranged to selectively provide suction from the pump 17 to one of the tubular members 4. The selecting means may comprise a rotatable member 8 with a passage therethrough and an opening 8a which is selectively connectable to a particular tubular member 4 by virtue of the rotation of the rotatable member 8. The rotatable member 8 may selectively connect opening 8a with a particular passage 7 for each tubular member 4. Thus, by turning the rotatable member 8 and connecting to each tubular member 4 in turn, all areas of the aquarium gravel may be thoroughly suctioned.

As depicted, the rotatable member 8 may be tubular and in the particular example shown, the rotatable member 8 may extend substantially vertically, e.g. from the base assembly 30 to a point above the gravel, e.g. above the water level. The rotatable member 8 may rotate within the chamber 31 provided in the second part 30b of the base assembly 30. The opening 8a may be provided at or towards the bottom of the rotatable member 8. The opening 8a may be provided in a side-wall of the rotatable member 8.

A rotatable joint 12 may be provided, e.g. at a top end of the rotatable member 8. The rotatable joint 12 may provide a fluid tight connection between the rotatable member 8 and a pipe 15 which connects to the pump 17. The rotatable joint 12 may be in the form of a universal ball joint connector which comprises a ball engaging the rotatable member 8 and a central passageway providing a fluid communication route between the pipe 15 and rotatable member 8. The ball may permit rotation between the ball and the rotatable member 8 and a seal may be provided therebetween. As a result, the rotatable joint 12 may allow the rotatable member 8 to rotate whilst maintaining a fluid tight connection between the pump 17 and rotatable member 8.

The rotatable member 8 may comprise a biased connector 9, which may be configured to provide a seal between the opening 8a of the rotatable member 8 with a selected tubular member 4. In particular, the biased connector 9 may provide a fluid tight connection between the rotatable member 8 and the passage 7 to ensure that the maximum suction pressure reaches the tubular member 4. The biased connector 9 may be provided at or towards the bottom of the rotatable member 8. The biased connector 9 may form a ball-and-socket type connection. For example, the biased connector 9 may have a substantially spherical head 9a which is biased towards the opening 8a by a resilient means, e.g. spring 9b. The spherical head 9a may comprise a central horizontal passageway to permit the flow of water through the biased connector 9. When the rotatable member 8 is rotated from one passage 7 to the next, the spherical head 9a of the connector 9 is pressed back against a side-wall of the chamber 31 surrounding the rotatable member 8. Then, when the connector 9 meets the passage 7 of the next tubular member 4, the spring 9b pushes the spherical head 9a into the passage 7 to tightly connect the passage 7 with opening 8a.

The rotatable member 8 may be rotated manually. However, the aquarium gravel cleaning system 100 may further comprise a second drive member configured to rotate the rotatable member 8. The second drive member, which may comprise a motor, e.g. a stepper motor, may drive the rotatable member 8 directly or the second drive member may drive the rotatable member 8 through a gear assembly. For example, the rotatable member 8 may be rotated through a gear 11 connected to the rotatable member 8 and a control gear 14, which may be positioned outside the aquarium. The control gear 14 may directly drive the gear 11 or, as depicted, a belt 13 may be provided between the control gear 14 and gear 11. The belt 13 may comprise teeth for engaging teeth provided on the gears 11, 14 or the belt and gears may have no teeth.

The belt 13 may be provided within a protective tube 13a, which may be flexible and may be made from plastic. The tube 13a may be fixed onto a side wall of the aquarium (not shown). Similarly, there may be protective rings 23 outside of both gear 11 and the control gear 14 to keep the belt 13 around them. The rings may be made from plastic. The ring 23 serving the gear 11 may be fixed on the wall of the tank through a connector, e.g. in the form of bar 23a. The bar 23a may be made from plastic. When the control gear 14 is rotated, e.g. by hand or via a motor (not shown), the belt 13 drives the gear 11 to turn the rotatable member 8 such that the next tubular member 4 may be fluidically connected to the pump 17.

Referring back to FIG. 1, the aquarium gravel cleaning system 100 may further comprises a first valve 16a arranged to selectively connect a first side of the pump 17 to the tubular members 4. The first valve 16a may selectively permit the suction flow from the rotatable member 8 to the pipe 15 and thence to the pump 17. The aquarium gravel cleaning system may further comprise a second valve 16b arranged to selectively connect a second side of the pump 17 to a container (not shown) via pipe 15c. The container may receive the suctioned water from the pump 17.

In addition to providing suction to the tubular members 4, the pump 17 may in a second mode of operation provide clean water to the aquarium. To enable this additional mode of operation, the first valve 16a may also be arranged to selectively connect the pump 17 to a source of clean water via a pipe 15a. The source of clean water may comprise dirty water taken from the aquarium after it has passed through a filter (not shown). The second valve 16b may also be arranged to selectively connect the pump 17 to the aquarium to provide the aquarium with the clean water via a pipe 15b. As such, the first and/or second valves 16a, 16b may be three-way valves with the valves being able to fluidically connect any two outlets. Thus, after the suction cleaning of the gravel has finished, switches or handles in the valves 16a, 16b may be activated (either manually or automatically) to allow the pump 17 to again provide clean water to the aquarium.

A control system (not shown) may be provided to manage the power to the pump, the valve settings and power to the first and/or second drive members (where provided). For example, a switch, e.g. a toggle switch, may be provided, which in a first position configures the pump 17 and valves 16a, 16b to provide clean water to the aquarium and in a second position configures the pump and valves to suck water from within the tubular members 4. When in the second position, the switch may also activate the motor for rotating the rotatable member 8 so that each tubular member 4 may be automatically selected in turn. If provided, the motor which may drive the rotation of the tubular members 4, may also be activated when the switch is in the second position.

In summary, some of the advantages of the present invention are as follows:

The gravel cleaning system may be modular and may thus be extended to cover any size of aquarium. Equally, the suction holes on the side of the base assembly allow the suction effect to go beyond the area covered by the base assembly. As a result one size of base assembly may serve a range of different aquarium sizes.

Effective cleaning of the gravel as every corner in the gravel can be cleaned effectively by the equal and focused suction power.

The cleaning system is very easy to use as once the system is installed at the bottom of the aquarium, it is a simple case of operating the pump to provide suction and all the bottom area of the aquarium may be suctioned automatically.

There may be no interruption to the fish. The aquarium does not have to be emptied to clean the gravel and the suction procedure happens under the gravel quietly.

As the suction is very effective, it would not suction out too much water to clean the gravel. However, the right amount of water can still be suctioned out in order to perform the correct amount of water changing.

This system will significantly reduce the cleaning frequency of a filter.

The configuration of the water hoses makes the water changing very easy by using the same pump to pump the treated water to the aquarium.

The arrangement disclosed herein, e.g. with the rotatable member, makes it possible to use this system in a high walled tank without any inconvenience.

It is to be noted that the present invention is not limited to applications requiring suction. For example, the above-described arrangement may be reversed such that the pump is configured to expel fluids from the pump to the tubular member, through the respective openings and thence to a region adjacent to the fluid transfer system. For example, the expulsion of fluids from the fluid transfer system may be applied to the aquarium gravel cleaning system to help dislodge any debris, e.g. prior to a suction mode of operation. The present invention may provide the suction or expulsion of fluids in any other application.

In addition to the aquarium gravel cleaning system described above, the present invention may be applied in other applications requiring the transfer of fluids. For example, the arrangement and features described above with respect to the gravel cleaning system may be applied in any other fluid transfer application, in particular the present invention may be applied in cases where a focussed flow of fluids is required. Particular examples include a vacuum suction head (e.g. for a vacuum cleaner), a tune changeable musical instrument (e.g. flute), a water feature (e.g. a fountain or sprinkler) or any other fluid transfer system.

In the case of a vacuum suction head, the opening or openings of the receiving portion may be positioned adjacent to a surface to be vacuumed and the dust from the surface may be sucked into the tubular member. As this suction is focused, only a fraction (e.g. half or one third) of the power used in a common vacuum device (e.g. cleaner) will be enough to achieve the same effect. Furthermore, the noise from the vacuum device will be reduced significantly.

In the case of a tune changeable flute, a reed may be operatively connected to the tubular member, which is provided in a pipe corresponding to the receiving portion described above. When air is blown in through the reed, the resulting air flow impels the fins in the tubular member and drives the tubular member to spin. The tune from the pipe will change automatically as air flows out from openings at different distances to the reed.

In the case of a water feature, a water pump may be operatively connected to the tubular member. The water flow may impel the fins and drive the tubular member to spin. The water flow may come out from the receiving portion at successive locations.

The invention claimed is:

1. An aquarium gravel cleaning system comprising:

a base assembly comprising a receiving portion, said base assembly being arranged adjacent to the gravel at a bottom of an aquarium;

the receiving portion comprising a passage for receiving a tubular member such that the tubular member fits within the passage and that the tubular member is free to rotate with respect to the receiving portion, wherein the receiving portion comprises a slit shaped opening arranged along the length of the receiving portion passage;

where the tubular member comprises a slit shaped opening arranged along the length of the tubular member, one or more vanes provided in the tubular member, wherein the tubular member is connected to a pump to suck aquarium fluid through the tubular member;

wherein the slit shaped opening of the tubular member is spirally disposed; by contrast, the slit shaped opening of the receiving portion is straight and longitudinally disposed such that there is only partial overlapping between the openings of the tubular member and receiving portion at a particular longitudinal location and at a particular relative rotational position between the tubular member and receiving portion;

where the vanes are configured to rotate the tubular member upon the flow of the aquarium fluid through the tubular member, and that as the tubular member rotates with respect to the receiving portion the partial overlap of openings moves along the length of the tubular member and receiving portion as the aquarium fluid is sucked into the tubular member from around the gravel at successive longitudinal locations.

2. The aquarium gravel cleaning system of claim 1 further comprising a selecting means arranged to selectively provide suction to the tubular member.

3. The aquarium gravel cleaning system of claim 2, wherein the selecting means comprises a rotatable member with an opening which is selectively connected to the tubular member by virtue of the rotation of the rotatable member.

* * * * *